(12) United States Patent
Shipley et al.

(10) Patent No.: US 9,394,853 B2
(45) Date of Patent: Jul. 19, 2016

(54) STRAIN MEASUREMENT DEVICE, A SOLID ROCKET MOTOR INCLUDING SAME, AND RELATED METHODS

(75) Inventors: John L. Shipley, Tremonton, UT (US); Russell A. Crook, Ogden, UT (US); Robert P. Graham, Tremonton, UT (US); Lydia L. Biegert, Pleasant View, UT (US); David H. Johnson, South Ogden, UT (US)

(73) Assignee: Orbital ATK, Inc., Plymouth, MN (US)

( * ) Notice: Subject to any disclaimer, the term of this patent is extended or adjusted under 35 U.S.C. 154(b) by 1038 days.

(21) Appl. No.: 13/271,416

(22) Filed: Oct. 12, 2011

(65) Prior Publication Data

US 2014/0130480 A1    May 15, 2014

(51) Int. Cl.
| | |
|---|---|
| B64D 1/04 | (2006.01) |
| C06B 21/00 | (2006.01) |
| F02K 9/38 | (2006.01) |
| F02K 9/34 | (2006.01) |
| B29C 70/68 | (2006.01) |
| G01M 5/00 | (2006.01) |
| G01B 7/16 | (2006.01) |
| B29C 33/16 | (2006.01) |

(52) U.S. Cl.
CPC . *F02K 9/38* (2013.01); *B29C 33/16* (2013.01); *B29C 70/68* (2013.01); *F02K 9/346* (2013.01); *G01B 7/16* (2013.01); *G01M 5/0041* (2013.01); *F05D 2260/80* (2013.01); *F05D 2270/808* (2013.01)

(58) Field of Classification Search
CPC .................. B64D 1/04; C06B 21/00
USPC .......................... 149/109.6; 89/1.1
See application file for complete search history.

(56) References Cited

U.S. PATENT DOCUMENTS

| | | | |
|---|---|---|---|
| 3,839,861 A * | 10/1974 | Herz | 60/234 |
| 4,782,705 A | 11/1988 | Hoffmann et al. | |
| 5,675,089 A | 10/1997 | Hawkins | |
| 6,464,306 B2 | 10/2002 | Shaw et al. | |
| 6,776,049 B2 | 8/2004 | Johnson et al. | |
| 7,261,028 B2 * | 8/2007 | Devries et al. | 89/1.1 |
| 7,581,450 B2 | 9/2009 | Johnson et al. | |
| 7,652,488 B1 | 1/2010 | Lopatin | |
| 8,147,135 B2 | 4/2012 | Shipley et al. | |

(Continued)

OTHER PUBLICATIONS

Andrew, United States Statutory Invention Registration entitled "Main-Stage Solid-Propellant Rocket Motor Design," Reg. No. H1082, Published Aug. 4, 1992, 11 pages.

*Primary Examiner* — Aileen B Felton
(74) *Attorney, Agent, or Firm* — TraskBritt

(57) ABSTRACT

A strain measurement device includes a reference material, and a displacement sensor configured to detect relative changes in distance between the sensor and the reference material. At least one of the displacement sensor and the reference material is coupled with a pre-cured elastomeric material. The displacement sensor generates a data signal to a processor that is configured to determine a strain of another elastomeric material based at least in part on the data signal received from the sensor. A displacement sensor and a reference material may be positioned within an elastomeric material within a casing of a solid rocket motor for determining strain experienced by the elastomeric material, such as the propellant of the solid rocket motor. A method includes installing a sensor of an elastomeric material. Another method includes determining strain of an elastomeric material of a solid rocket motor.

24 Claims, 13 Drawing Sheets

(56) References Cited

U.S. PATENT DOCUMENTS

| | | |
|---|---|---|
| 8,596,137 B2 | 12/2013 | Mathias et al. |
| 8,708,555 B2 | 4/2014 | Shipley et al. |
| 2008/0105059 A1 | 5/2008 | Turnbull et al. |
| 2014/0130603 A1 | 5/2014 | Mathias et al. |

* cited by examiner

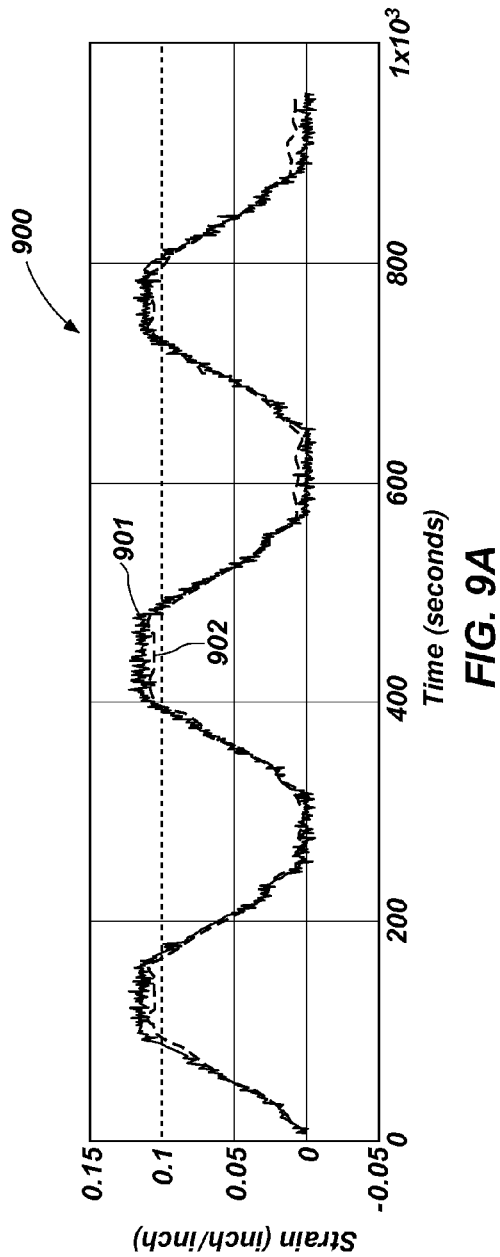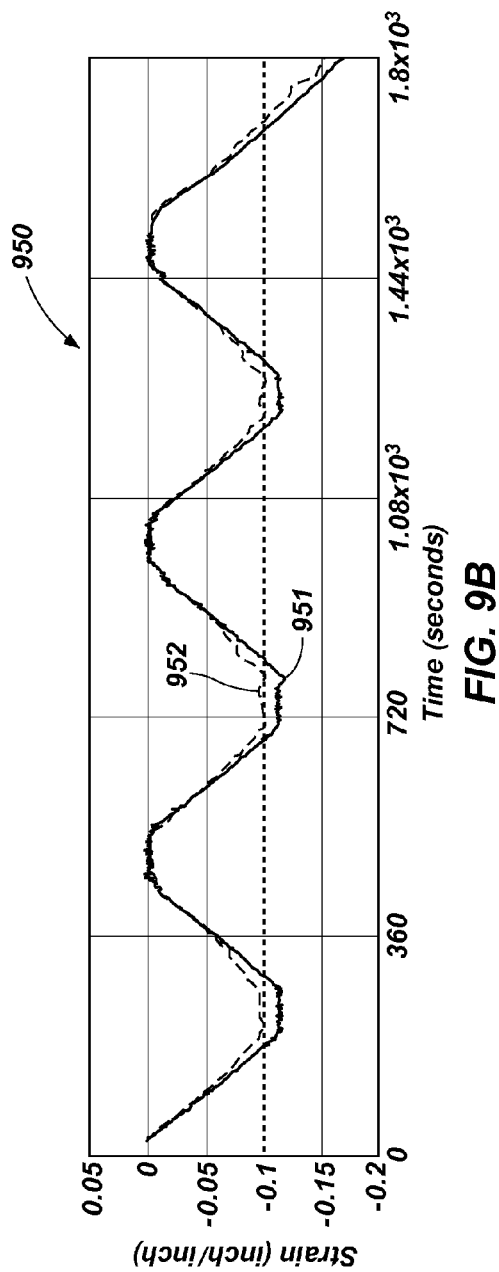
FIG. 9A
FIG. 9B

US 9,394,853 B2

STRAIN MEASUREMENT DEVICE, A SOLID ROCKET MOTOR INCLUDING SAME, AND RELATED METHODS

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. N00030-08-C-0100, Subcontract No. 8100002078, awarded by the United States Department of the Navy.

TECHNICAL FIELD

Embodiments of the present disclosure relate to sensors, and more specifically, to an apparatus and methods related to detecting strain within an elastomeric material, such as a hyperelastic material, which may include propellant of a solid rocket motor.

BACKGROUND

Strain on the propellant of a solid rocket motor may be experienced during a relatively short time interval such as during launch of the solid rocket motor, or over a relatively long period of time such as while the solid rocket motor is in storage. If a threshold for strain (or stress) on the propellant is exceeded, microscopic cracks may occur at one or more locations throughout the propellant of the solid rocket motor, which may coalesce into macroscopic cracks in the propellant. In addition, uncertainty in the size, location, and orientation of distributed microscopic cracks may result in uncertainty in the analytical models (i.e., constitutive models) designed to assess structural allowable stresses and strains for the propellant. Cracks that occur in the propellant near the casing of the solid rocket motor, such as the propellant-liner interface may cause hot gas to be present near the wall. In addition, if a crack near the liner propagates in the propellant, the propellant may become detached from the bonding surface of the liner. Debonding may cause similar issues as the cracks described above in that the concerns include augmented burning in the propellant, including near the wall of the casing, as well as concerns regarding the structural impact of the decreased bonding with the liner.

In addition, environmental factors (e.g., moisture) may weaken the adhesion strength of the propellant binder to the surface of the reinforcing and combustible fillers in the solid rocket motor over time, which can result in reduced load bearing capability of the propellant. Because there is often uncertainty associated with the constitutive properties of these polymeric systems especially when exposed to environmental aging, the term "health" of solid rocket motor is sometimes used to classify the launch readiness of the solid rocket motor and the propellant's ability to withstand damage during the dynamic launch event.

Because of the uncertainty associated with analytical models, and in view of the potential problems discussed above, information regarding the health of the propellant may be desired. Several types of embedded sensors may be used in a solid rocket motor. For example, small pressure sensors may be used as bond line sensors to measure the stress between the propellant and case. The pressure sensors may detect the perturbation in the stress field due to the presence of damage in the propellant. Another type of sensor is an optical fiber strain sensor. Optical fiber strain sensors are used in a similar manner as bond line pressure sensors, in that optical fiber strain sensors detect changes in the strain field due to the presence of damage in the propellant.

Another type of sensor is a strain gauge. While conventional strain gauges may be effective for determining strain of stiff materials, such as the casing of a solid rocket motor, strain gauges may have shortcomings while determining the strain of an elastomeric material. Because conventional strain gauges are often coupled to a stiff polymer backing, conventional strain gauges may not stretch far enough to obtain an accurate determination of the strain exhibited by the propellant, giving a lower strain reading than expected. In addition, as conventional strain gauges are stiffer than the propellant, the strain gauge may restrict the propellant from stretching near the strain gauge, while propellant that is distant from the strain gauge may stretch more freely. As a result, the data from the conventional strain gauge may provide an inaccurate view of the strain experienced by the propellant, in particular for locations that are remote from the strain gauges.

BRIEF DESCRIPTION OF THE SEVERAL VIEWS OF THE DRAWINGS

FIGS. 9A and 9B are plots of test results from a strain sensor coupled with a pre-cured elastomeric according to an embodiment of the present disclosure.

DETAILED DESCRIPTION

Figure 1:
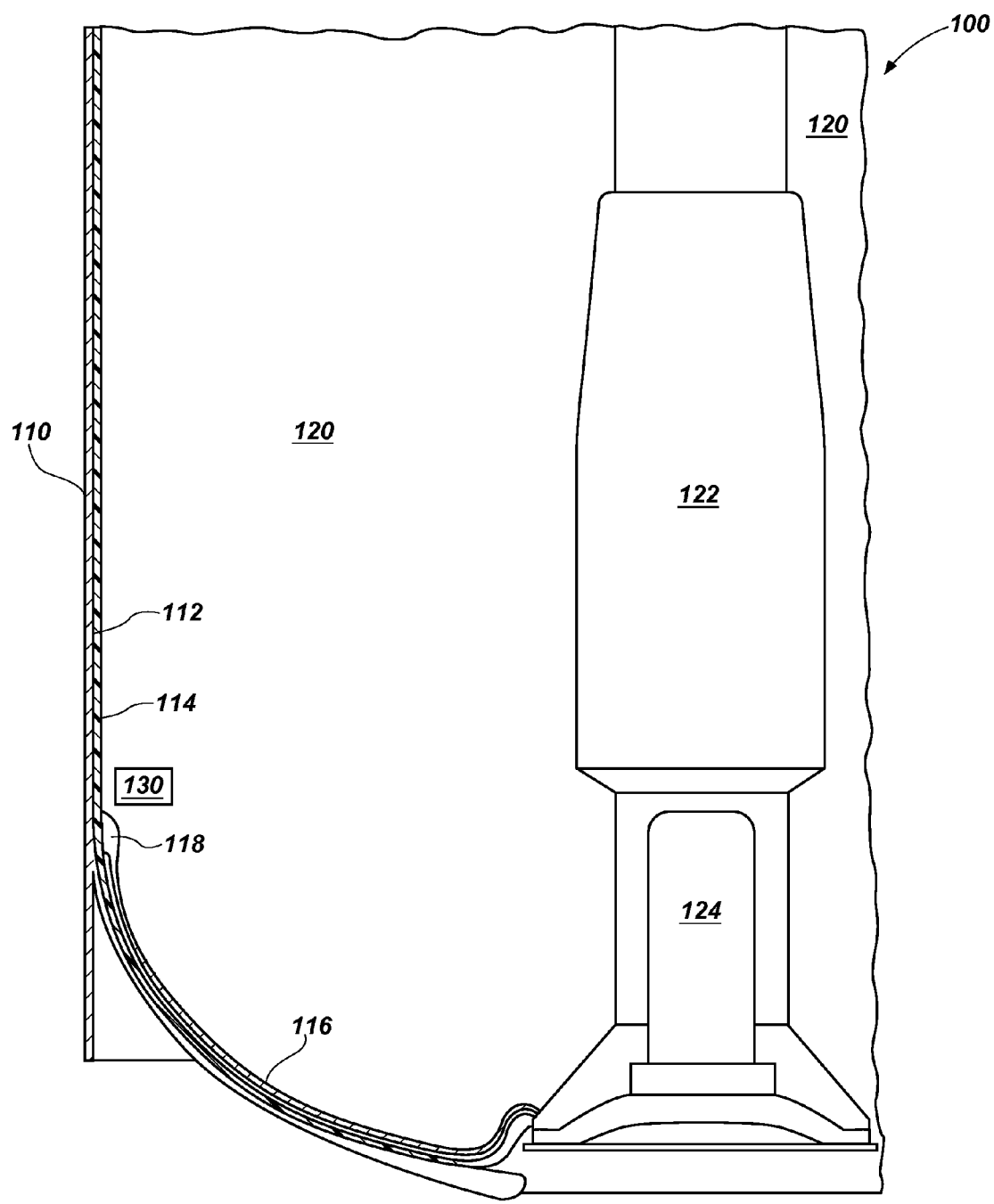
FIG. 1 is a solid rocket motor according to an embodiment of the present disclosure.

In this description, specific implementations shown and described are only examples and should not be construed as the only way to implement the present invention unless specified otherwise herein. It will be readily apparent to one of ordinary skill in the art that the various embodiments of the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Referring in general to the following description and accompanying drawings, various embodiments are illustrated to show its structure and method of operation, sufficient to enable one of ordinary skill in the art to make, use, or otherwise practice the present invention. Common elements of the illustrated embodiments may be designated with similar reference numerals. It should be understood that the figures presented are not meant to be illustrative of actual views of any particular portion of an actual structure or method, but are merely idealized representations employed to more clearly and fully depict the present invention defined by the claims below. It is to be understood that other embodiments may be utilized, and that structural, logical, and electrical changes may be made within the scope of the disclosure.

It should be appreciated and understood that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals including a single data signal.

The various illustrative logical blocks, modules, and circuits described in connection with the embodiments disclosed herein may be implemented or performed with a processor such as a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. A reference to first and second elements does not mean that only two elements may be employed there or that the first element must precede the second element in some manner. Also, unless stated otherwise a set of elements may comprise one or more elements.

Embodiments of the present disclosure include a sensor configured to measure local strains in elastomeric materials, such as solid propellant in solid rocket motors and other complex composite elastomeric materials. Integration of embedded sensors into elastomeric materials may provide analysts with strain data that may be useful in calibrating material models in structural design to enable accurate verification of safety factors, and in the validation of structural margins of safety.

While the term "elastomer" may be a term that has a conventional definition that is limited to polymers, the terms "elastomer" and "elastomeric" materials are defined herein as materials that exhibit the physical property of being generally elastic, including properties of changing its length, volume, and/or shape responsive to an applied force effecting such a change. Thus, as used herein, terms such as "elastomer" and "elastomeric materials" are not intended for this application to be limited to polymers (e.g., rubber) unless specifically described as such, and may include non-polymers that exhibit similar properties and effects responsive to application of a force. For example, elastomeric materials may include rubbers, plastics, silicones, polymers, resins, foods, propellants, gumstocks, woods, high viscosity fluids, viscoelastic solids, and other similar materials. Elastomeric materials that are polymers may include rubber insulation of the family known as Nitrile Butyl Rubber, Room Temperature Vulcanized (RTV) Rubber, Silicone Rubber, Ethylene Propylene Diene Monomer (EPDM) Rubber, Urethane Rubber, Hydroxy Terminated Polybutidiene (HTPB) Rubber, Inorganic Phosphazene Rubbers, and Natural Rubber. Elastomeric materials may include materials that include mixtures of different materials, such as particulate- and fiber-reinforced elastomers, and may include propellants of solid rocket motors. For example, generally solid propellants of solid rocket motors may include combustive and particulate materials mixed within an elastomeric material (e.g., a rubber-based polymer), such that the propellant exhibits nonlinear time dependent stress and strain behavior when mechanically deformed above the linear viscoelastic limit (i.e., generally associated with distributed time dependent microcracking or damage). Therefore, propellants of solid rocket motors may also be an elastomeric material.

In addition, it is recognized that some elastomeric materials, as defined herein, may recover to substantially its original form upon removal of a force. For example, the state (e.g., shape, volume, orientation, etc.) of the elastomeric material may be substantially the same before and after deformation of the elastomeric material in response to application of the force. If the force exceeds a certain threshold (e.g., linear viscoelastic limit), the elastomeric materials may experience a permanent change in the state (e.g., shape, volume, orientation, etc.) of the elastomeric material. The linear viscoelastic limit of the elastomeric material may depend at least in part on the particular material or mixture of materials used to form the elastomeric material as well as the history of the material. Therefore, while it is recognized that the term "elastic" may traditionally mean that there is no loss of potential energy when a material is deformed, elastomeric materials, as defined herein may experience a loss of potential energy during deformation due to a force. Strains in elastomeric materials (e.g., hyperelastic materials) that often are used as propellants may be as high as several hundred percent (e.g., between 100% to 200% strain) before permanent deformation to the elastomeric material occurs. For some elastomeric materials, the strain may not be preserved as the onset of debonding, and reorganization of a particle pack may result in distributed damage that results in nonlinear strains throughout the elastomeric material.

FIG. 1 is a solid rocket motor 100 according to an embodiment of the present disclosure. The solid rocket motor 100 includes a casing 110 that has an internal casing wall 112 defining an internal cavity to house a propellant 120 therein. The propellant 120 may include a central bore 122 there-through, and may be ignited by an igniter 124. A liner 114 separates the propellant 120 and the casing 110. The liner 114 may be formed from materials such as a polyurethane adhesive, and the like. The liner 114 may provide an adhesive interface that bonds to the propellant 120 and the casing 110 or casing insulation (not shown) such that the interfacial bond will be capable of withstanding the strain and stress to which the propulsion subsystem may be subjected during ignition, launch, maneuver, etc. The shear forces present during operation of the solid rocket motor 100, especially at launch, may cause strain in the liner 114. Strain may also be experienced by the propellant 120 itself. Such strain may cause failure of the adhesive bond at the liner 114 or excessive strain to the propellant 120, which may result in cracking of the propellant 120, premature discharge of the propellant 120, or other undesired results that may compromise the operation of the solid rocket motor 100.

The propellant 120 may be cast within the casing 110 of the solid rocket motor 100. For solid rocket motors, the propellant 120 may be introduced into the solid rocket motor 100 in a viscous form and then cured to a solid form. An elastomeric material may be mixed with the propellant 120 such that the propellant 120 exhibits elastic properties to reduce cracking during ignition, as well as during transportation and storage. While curing, the propellant 120 may shrink, which may cause the liner 114 to tear from the casing 110 or cause the propellant 120 to tear from the liner 114. A portion of the liner 114, called a flap 116, may be split into two portions, such that if the propellant 120 shrinks, the portion of the flap 116 coupled to the casing 110 remains coupled to the casing 110 while the portion of the flap 116 coupled to the propellant 120 remains coupled to the propellant 120. The flap 116 may provide some allowance in the liner 114 for the propellant 120 to shrink during curing before either the propellant 120 tears away from the liner 114, or the liner 114 tears away from the casing 110. A junction where the flap 116 begins is referred to as a flap bulb 118, which is the location at which the liner 114 is generally first coupled to both the casing 110 and the propellant 120 without a gap therebetween.

The solid rocket motor 100 may further include a strain sensor 130, the details of which will be described below with reference to the subsequent figures. The strain sensor 130 may be coupled to an elastomeric material of the solid rocket motor 100 to determine a characteristic of that elastomeric material, such as the strain experienced by the elastomeric material. For example, the strain sensor 130 may be coupled to the propellant 120, such as being embedded within the propellant 120. In another embodiment, the strain sensor 130 may be coupled to the liner 114, such as being embedded within the liner 114.

In addition, one or more strain sensors 130 may be positioned at various locations within the solid rocket motor 100, as desired to determine stress and local strain at the different locations and for different elastomeric materials. For example, one or more strain sensors 130 may be positioned proximate the flap bulb 118. Because the portion of the propellant 120 coupled to the flap 116 may not be coupled to the casing 110, this portion of the propellant 120 may move relatively freely under acceleration. As a result, the propellant 120 near the flap bulb 118 may experience the most strain and stress, where the propellant 120 has a junction with the casing 110 and restricts movement of the propellant 120. Thus, the portion of the propellant 120 proximate the flap bulb 118 may be particularly desirable for placement of the strain sensor 130. Another embodiment may include the strain sensor 130 coupled with the liner 114 proximate the flap bulb 118. In other words, the strain sensor 130 may be configured to determine displacement of the liner 114, such as at the flap 116, or in the propellant 120, such that the strain associated therewith may also be determined.

Figure 2:
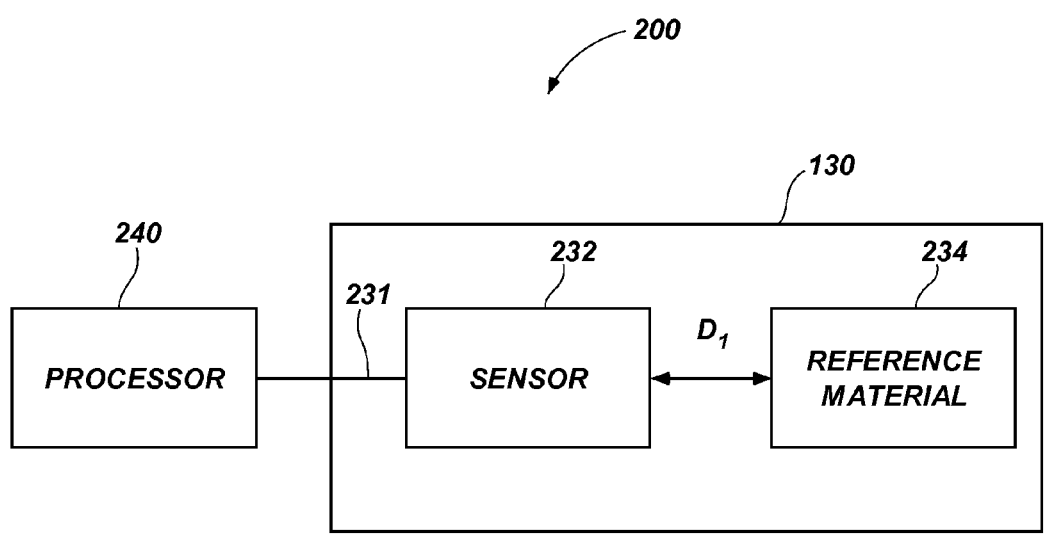
FIG. 2 is a schematic block diagram of a strain measurement device according to an embodiment of the present disclosure.

The data from the strain sensor 130 may be received by a processor 240 (FIG. 2). The processor 240 may be part of a data acquisition system, such as a health monitoring system of the solid rocket motor 100. The data may be recorded in real-time to determine the strain of the elastomeric material being monitored by the strain sensor 130, such as the propellant 120 or the liner 114. For example, the data may be acquired during testing of the solid rocket motor 100. For example, a test may include a simulation sled that accelerates to simulate the ignition of the solid rocket motor 100. During such testing, the solid rocket motor 100 may include an elastomeric material in place of the propellant 120, and the strain sensor 130 may be coupled thereto. For example, such an elastomeric material may be hydroxyl-terminated polybutadiene (HTPB) gum-stock, which is sometimes used to simulate the propellant 120. In some embodiments, testing may be performed with actual propellant 120 cast in the solid rocket motor 100 without actually burning the propellant 120. Obtaining the data from the strain sensor 130 during testing may help to determine if the propellant 120, liner 114, or other elastomeric material may experience strain and stress sufficient to crack, tear, or otherwise fail during launch of the solid rocket motor 100. Data from such testing may be compared with computer simulations and finite element analysis of the solid rocket motor 100 and the propellant 120, which may aid in the design of the solid rocket motor 100 and propellant 120.

As another example, the data may be acquired from the solid rocket motor 100 after the propellant 120 has been cast, such as with real-time health monitoring during launch of the solid rocket motor 100, or with real-time health monitoring during transportation and storage of the solid rocket motor 100. Real-time health monitoring may be used to verify the integrity of the solid rocket motor 100. For example, during storage of the solid rocket motor 100, the strain in the propellant 120 or other elastomeric materials may be monitored over a long period of time as properties of the propellant 120 may change (e.g., stiffen, soften, etc.).

FIG. 2 is a schematic block diagram of a strain measurement device 200 according to an embodiment of the present disclosure. The strain measurement device 200 includes the strain sensor 130 of FIG. 1 coupled with a processor 240. The strain sensor 130 includes a displacement sensor 232 and a reference material 234. The displacement sensor 232 may be configured to detect changes in the distance between the displacement sensor 232 and the reference material 234 and generate a data signal 231 (e.g., displacement data) in response thereto. The processor 240 may be configured to determine a strain of an elastomeric material that is based, at least in part, on the data signal 231 received from the displacement sensor 232.

The displacement sensor 232 may be a Hall-effect sensor that operates to detect a magnetic field and output the data signal 231 to the processor 240 in response thereto. Thus, the reference material 234 may be a magnetic material that generates a magnetic field detected by the displacement sensor 232. An example of a Hall-effect sensor is sensor model SH-410 that is available from Sypris Test and Measurement of Orlando, Fla. An example of the magnetic material may be a nickel clad cylindrical neodymium iron boron (NdFeB) magnet available from Magnet Sales & Manufacturing, Inc. of Culver City, Calif.

In another embodiment, the displacement sensor 232 may be an Eddy-current sensor that may include a coil that operates to actively generate an oscillating sinusoidal magnetic field that causes Eddy-currents to be generated within the reference material 234. Thus, the reference material 234 may be any material that generates Eddy-currents in response to a surrounding magnetic field. For example, the reference material 234 may be a conductive material, such as aluminum, or another metal or metal alloy. An Eddy-current sensor may detect a change in the inductance of the coil caused by the Eddy-currents in the reference material 234, and output the data signal 231 to the processor 240 in response thereto. Embodiments that include electrical currents in the presence of energetic materials may further include intrinsic safety barriers, as a current may be generated within the propellant 120.

The displacement sensor 232 and the reference material 234 may be physically separated by an initial calibration distance ($D_1$) such that a relative displacement from the initial calibration distance ($D_1$) alters the output signal 231 by the displacement sensor 232. Prior to installation, the displacement sensor 232 and the reference material 234 may be calibrated at the initial distance ($D_1$) as a matched set. For example, the initial distance ($D_1$) may be approximately 0.2 inch. Of course, the initial distance ($D_1$) may be other distances, as desired, depending, at least in part on the sensitivity of the displacement sensor 232 and the strength of the field produced by the reference material 234. The distance between the displacement sensor 232 and the reference material 234 may change as the propellant 120 is strained. The processor 240 is configured to determine the relative displacement between the displacement sensor 232 and the reference material 234, and estimate a resulting strain on the propellant 120.

Figure 3A:
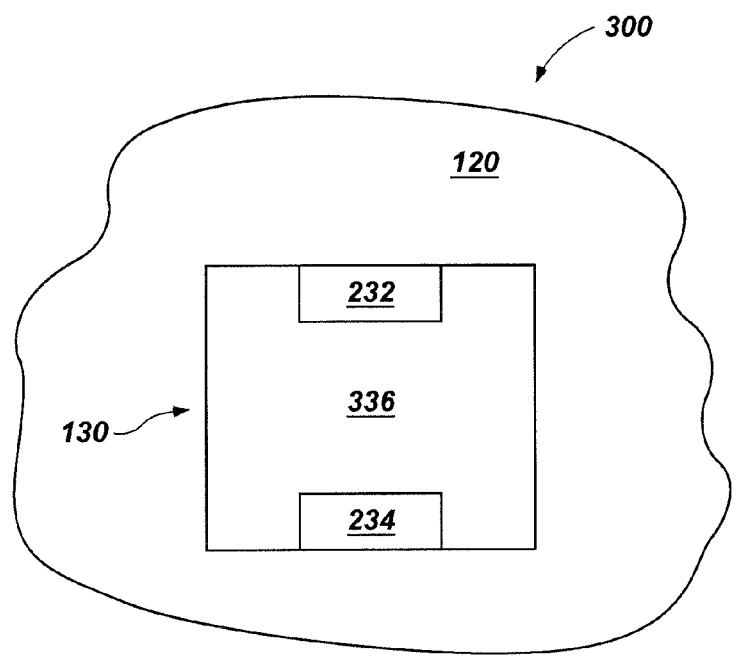
FIGS. 3A and 3B are side views of strain measurement devices according to embodiments of the present disclosure.
Figure 3B:
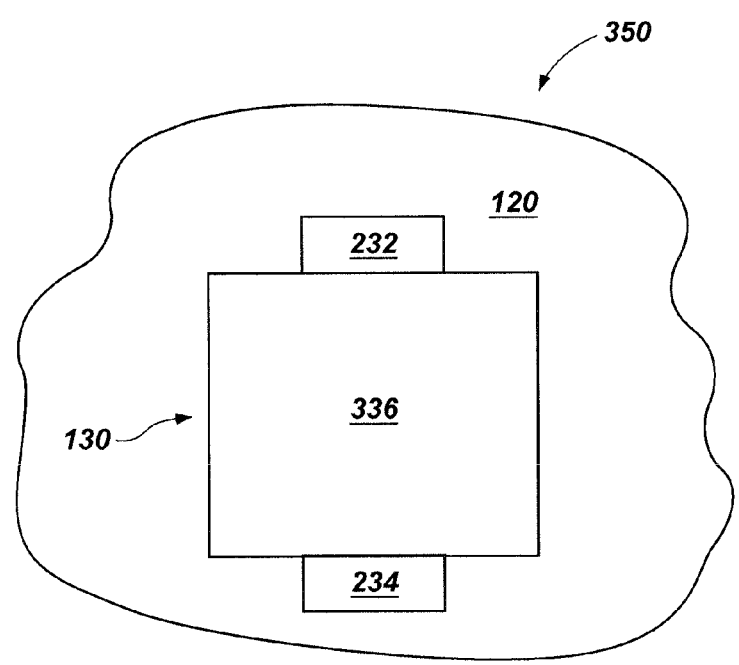

FIGS. 3A and 3B are side views of strain measurement devices 300, 350 according to embodiments of the present disclosure. The strain measurement devices 300, 350 may be configured to determine strain experienced by an elastomeric material, such as propellant 120 of the solid rocket motor 100 (FIG. 1). The strain measurement devices 300, 350 include the strain sensor 130 of FIGS. 1 and 2, which may further include displacement sensor 232 and reference material 234 coupled with a pre-cured elastomeric material 336. The pre-cured elastomeric material 336 may be formed as a desired shape, such as a cube, with precise dimensions to control the initial distance ($D_1$) of the of the displacement sensor 232 and the reference material 234. In other words, the pre-cured elastomeric material 336 may act as a spacer between the displacement sensor 232 and the reference material 234 having an initial distance ($D_1$).

The pre-cured elastomeric material 336 may be coupled to a second elastomeric material, such as the propellant 120 of a solid rocket motor 100. In some embodiments, the another elastomeric material may be the liner 114 (FIG. 1) of the solid rocket motor 100. For ease of discussion, the description may be directed to a strain sensor 130 associated with measuring the strain within the propellant 120 of a solid rocket motor 100; however, it is contemplated that additional embodiments include a strain sensor 130 associated with measuring the strain within another elastomeric material that is part of a system that is not a solid rocket motor 100.

The displacement sensor 232 may be configured to detect changes in the distance between the displacement sensor 232 and the reference material 234 and generate a data signal in response thereto. The data signal may be transmitted to a processor 240 (FIG. 2) that is configured to determine a strain of the propellant 120 based at least in part on the data signal received from the displacement sensor 232.

The pre-cured elastomeric material 336 may be positioned within the solid rocket motor 100 at a desired position for strain measurement, and the propellant 120 may be cast around the pre-cured elastomeric material 336. The propellant 120 may be introduced into the casing 110 (FIG. 1) in a viscous form, and be cured in the casing 110.

In operation, the displacement sensor 232 and the reference material 234 may move in conjunction with the pre-cured elastomeric material 336, which may stretch in conjunction with the propellant 120, in response to a force being applied thereto. The data signal from the strain sensor 130 may be used to determine the strain of the propellant 120. For example, the analysis to determine the strain of the propellant 120 may correlate to the relative displacement and the elastic properties of the pre-cured elastomeric material 336. To obtain an accurate measurement of the strain of the propellant 120, the pre-cured elastomeric material 336 may exhibit elastic properties similar to the propellant 120. For example, in some embodiments, the pre-cured elastomeric material 336 may include a pre-cured portion of the propellant 120 itself, or a material used in the propellant 120. In other words, the pre-cured elastomeric material 336 may have a substantially similar chemical composition as the propellant 120. In some embodiments, the pre-cured elastomeric material 336 may include a different type of elastomeric material. For example, the pre-cured elastomeric material 336 may include HTPB gum-stock, rubber, or other material having relatively high elongation properties. When using different types of elastomeric materials for the pre-cured elastomeric material 336 and the propellant 120, the strain analysis by the processor 240 (FIG. 2) may compensate for the different elastic properties to arrive at the determined strain of the propellant 120.

Figure 6:
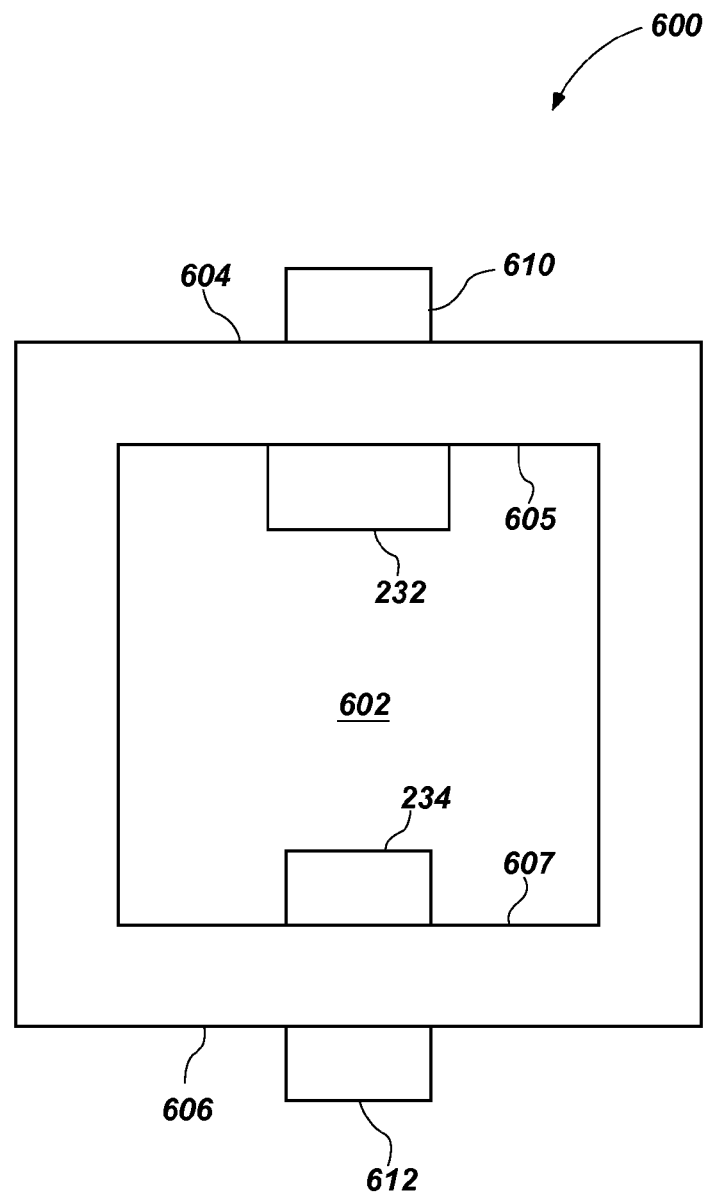
FIG. 6 is a mold for forming a pre-cured elastomeric material according to an embodiment of the present disclosure.

Referring specifically to FIG. 3A, the pre-cured elastomeric material 336 may be formed around the displacement sensor 232 and the reference material 234, such that at least a portion of the displacement sensor 232 and the reference material 234 are embedded within the pre-cured elastomeric material 336. For example, the displacement sensor 232 and the reference material 234 may be oriented and positioned to a desired initial position. An elastomeric material may be formed around the displacement sensor 232 and the reference material 234, such as in a mold 600 (FIG. 6). The elastomeric material may be cured in order to fix the initial positions of the displacement sensor 232 and the reference material 234 relative each other in order to form the pre-cured elastomeric material 336.

Referring specifically to FIG. 3B, the displacement sensor 232 and the reference material 234 may be coupled to outer surfaces of the pre-cured elastomeric material 336. For example, the displacement sensor 232 and the reference material 234 may be coupled to the outer surfaces of the pre-cured elastomeric material 336 with an adhesive material. The pre-cured elastomeric material 336 may be formed to a desired size and shape, and the displacement sensor 232 and the reference material 234 may be coupled thereto after curing.

Figure 3C:
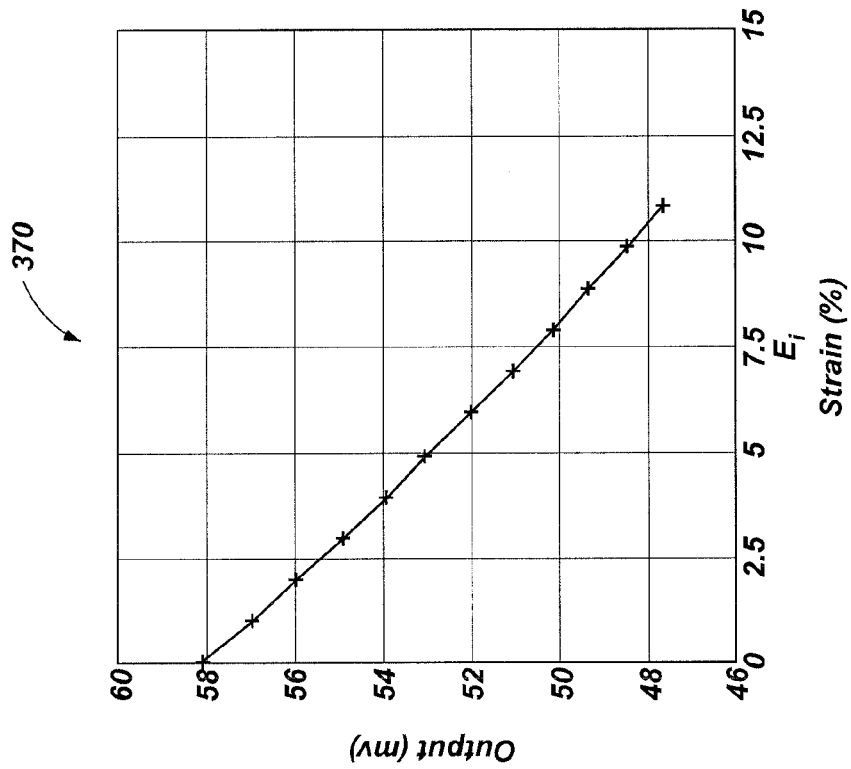
FIG. 3C shows plots illustrating the relationships between the output voltage, the distance between the displacement sensor and reference material, and the corresponding strain of the associated elastomeric material.
Figure 3C:
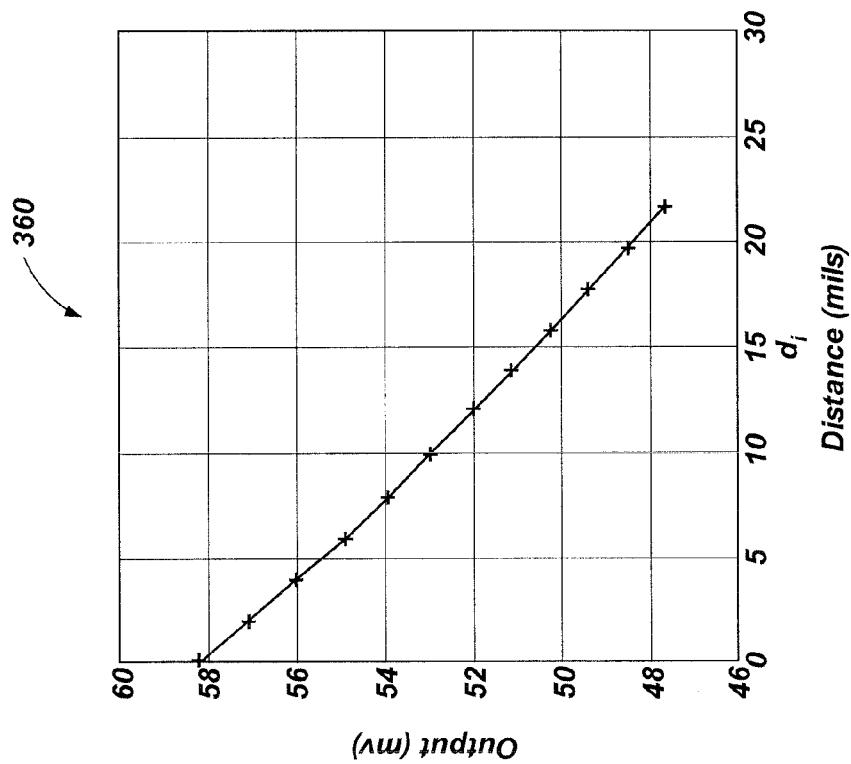

FIG. 3C shows plots 360, 370 illustrating the relationships between the output voltage, the distance between the displacement sensor 232 and reference material 234, and the corresponding strain of the associated elastomeric material (e.g., propellant 120). In particular, plot 360 shows the change in output voltage of the displacement sensor 232 as the distance between the reference material 234 and the displacement sensor 232 changes. Plot 370 shows the change in the corresponding strain of the associated elastomeric material according to the displacement data and the elastic properties of the associated elastomeric material. These relationships may be determined by calibration measurements of the displacement sensor 232 and the reference material 234 as a matched pair, which calibration measurements may be fit into equations (e.g., a linear fit, a quadratic fit, etc.) that may be used by the processor 240 (FIG. 2) during real-time operation.

As shown in plot 360, as the distance between the displacement sensor 232 and the reference material 234 increases, the output voltage from the displacement sensor 232 decreases. As shown in plot 370, as the output voltage from the displacement sensor 232 decreases, the strain of the associated elastomeric material increases. In other words, as the distance between the displacement sensor 232 and the reference material 234 increases, the strain of the associated elastomeric material increases.

Figure 4A:
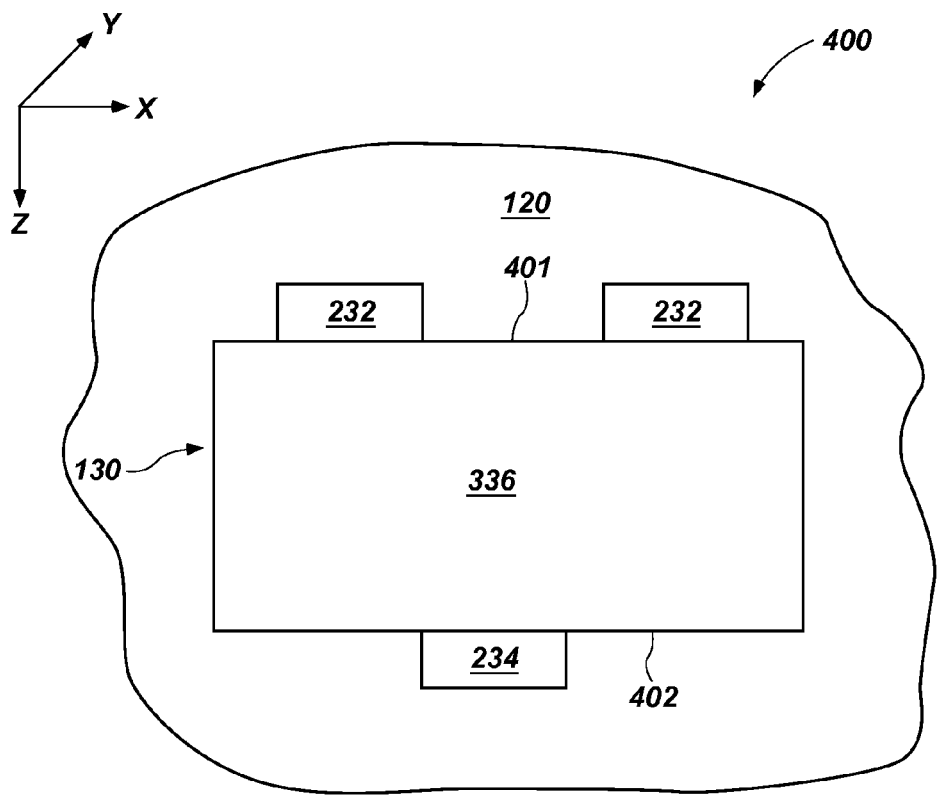
FIG. 4A is side view of a strain measurement device according to another embodiment of the present disclosure.
Figure 4B:
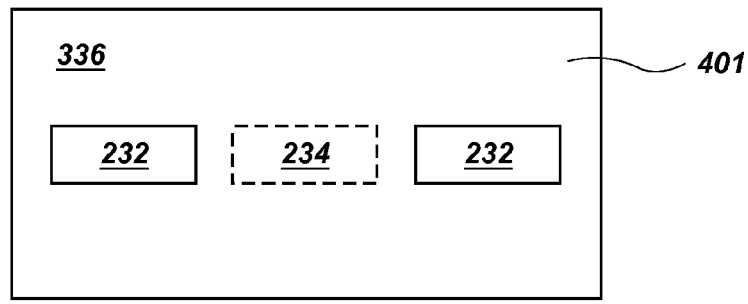
FIG. 4B is a top view of the strain measurement device of FIG. 4A.
Figure 5A:
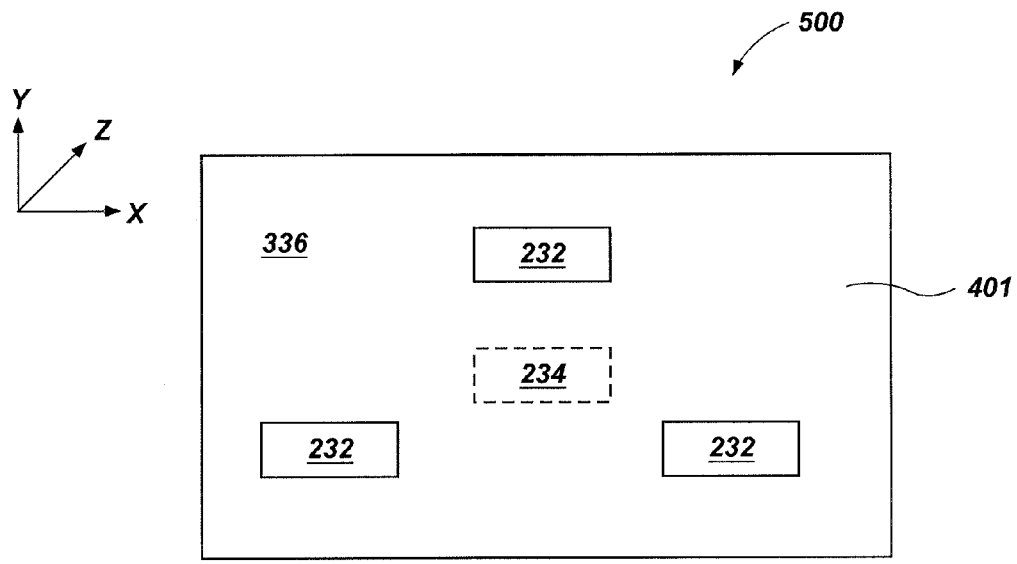
FIGS. 5A, 5B, and 5C are strain measurement devices according to additional embodiments of the present disclosure.
Figure 5B:
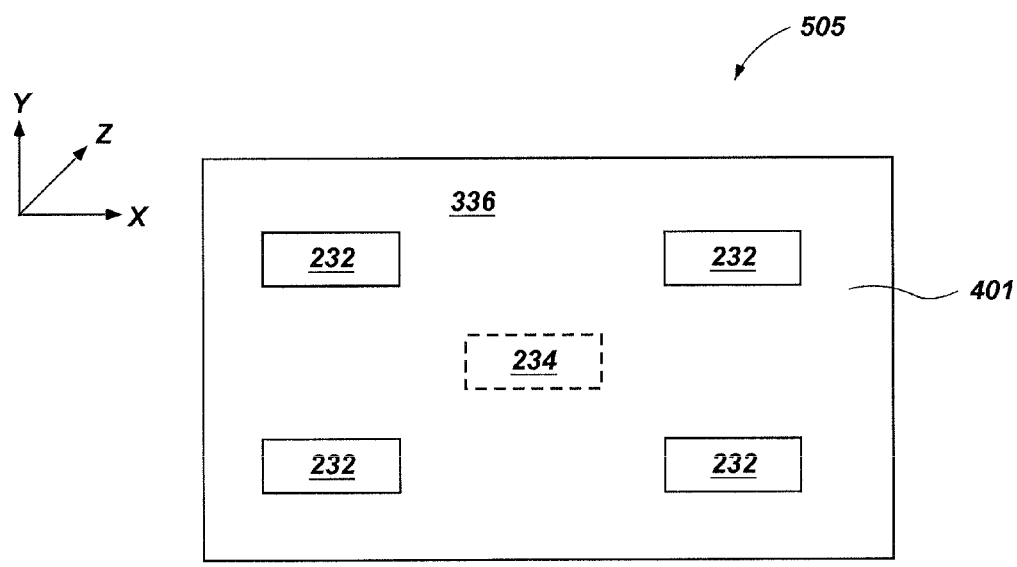
Figure 5C:
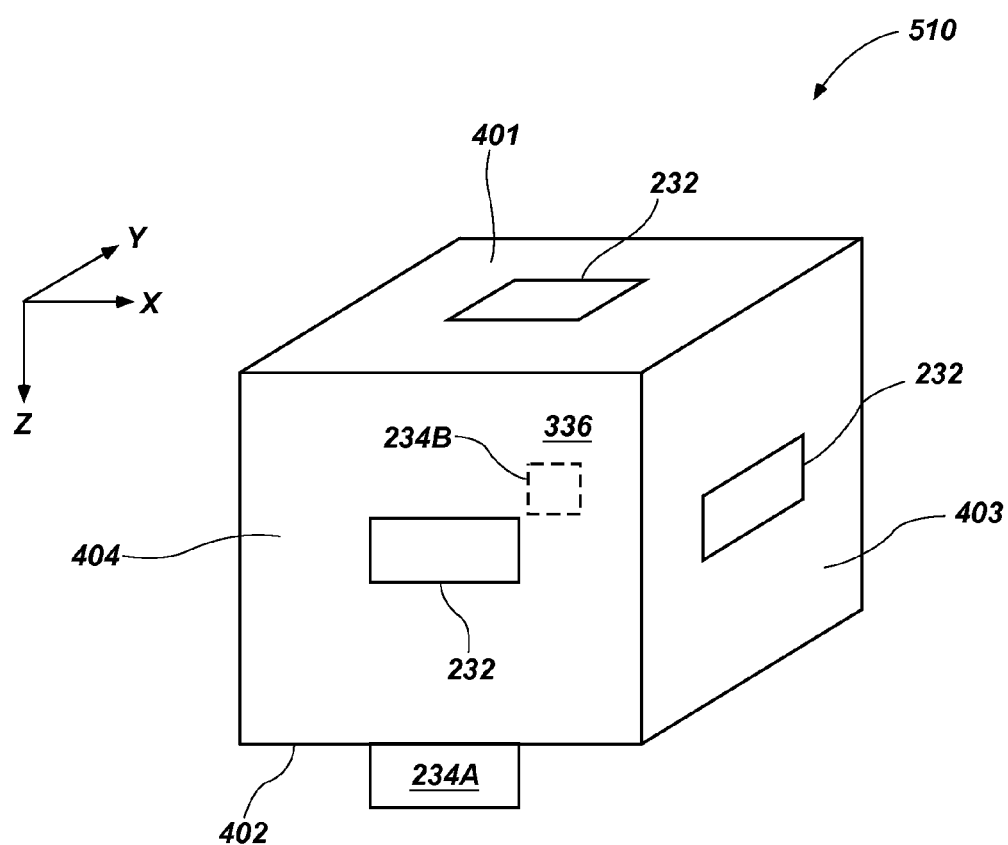

FIG. 4A is side view of a strain measurement device 400 according to another embodiment of the present disclosure. FIG. 4B is a top view of the strain measurement device 400 of FIG. 4A. The strain measurement device 400 includes a pre-cured elastomeric material 336 having a plurality of displacement sensors 232 coupled on the same surface of the pre-cured elastomeric material 336. For example, the plurality of displacement sensors 232 may be spaced apart, and coupled with a first surface 401 of the pre-cured elastomeric material 336. The reference material 234 may be coupled with a second surface 402 of the pre-cured elastomeric material 336. Of course, one or more of the plurality of displacement sensors 232 and the reference material 234 may be embedded within the pre-cured elastomeric material 336, coupled to an outer surface of the pre-cured elastomeric material 336, or a combination thereof, as discussed with reference to FIGS. 3A and 3B. In addition, the plurality of displacement sensors 232 and the reference material 234 may be configured as discussed above as a Hall-effect sensor, an Eddy-current sensor, or other sensor configuration as would be recognized by those skilled in the art. While the plurality of displacement sensors 232 coupled to the same surface of the pre-cured elastomeric material 336 is shown in FIGS. 4A and 4B as being two displacement sensors 232, more displacement sensors 232 may be used, examples of which are shown in FIGS. 5A, 5B, and 5C.

In operation, the plurality of displacement sensors 232 may be configured to provide displacement data on separate data channels. As a result, the combined displacement data generated by each of the plurality of displacement sensors 232 may be used by the processor 240 (FIG. 2) to determine the displacement from the initial location of the reference material 234 in space relative to the plurality of displacement sensors 232 in a plurality of directions. For example, the processor 240 may use the relative voltages of the output voltage signals to determine (e.g., by triangulation) the position of the reference material 234 in the directions that are axial and transverse to the plurality of displacement sensors 232. The axial direction is normal to the corresponding displacement sensor 232, and the transverse direction is parallel to the corresponding displacement sensor 232. As shown in FIG. 4A, the z-axis is in the axial direction and the x-axis is in the transverse direction of the plurality of displacement sensors 232. As a result, the strain experienced by the associated elastomeric material (e.g., propellant 120) may be determined in a plurality of directions as being proportional to the displacement of the reference material 234 and the properties of the associated elastomeric material, as discussed above with reference to FIG. 3C.

Figure 4C:
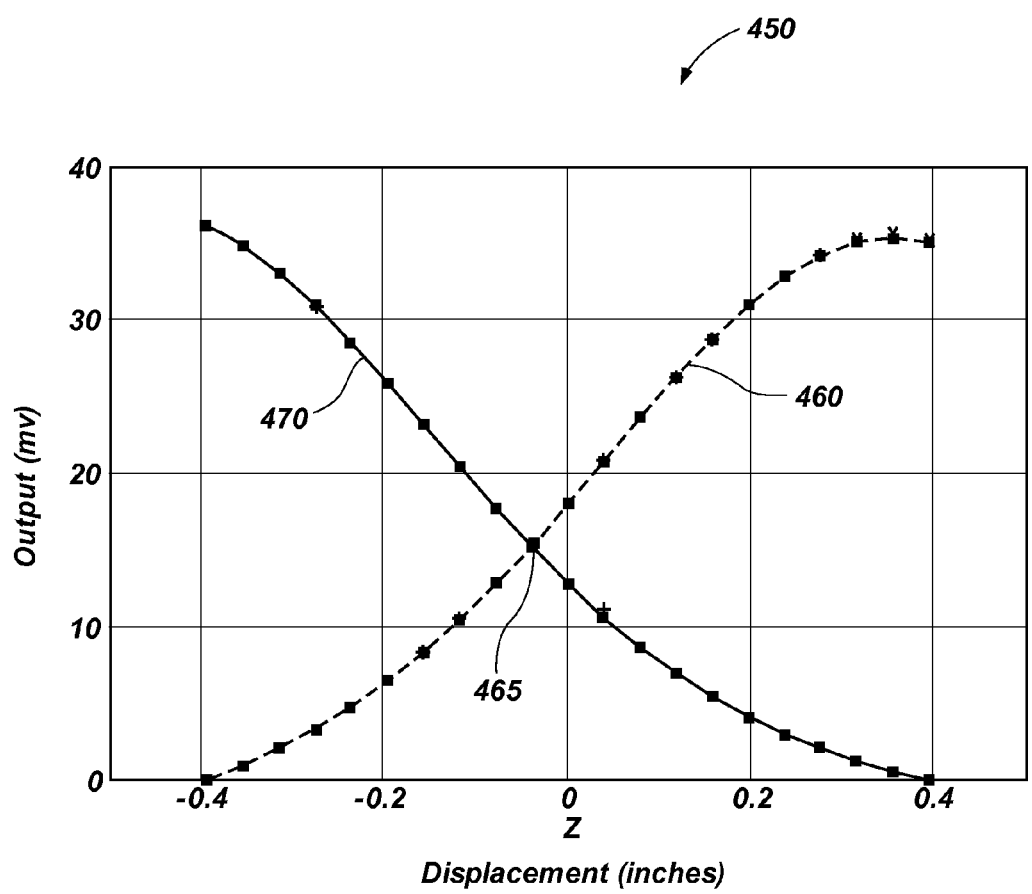
FIG. 4C is a plot of the relationship between output voltage of the plurality of displacement sensors and the displacement of the reference material in the transverse direction of the strain measurement device of FIGS. 4A and 4B.

FIG. 4C is a plot 450 of the relationship between output voltage of the plurality of displacement sensors 232 and the displacement of the reference material 234 in the transverse direction of the strain measurement device 400 of FIGS. 4A and 4B. For illustration purposes, the movement of the reference material 234 is in the x-direction only, such as being a constant distance in the z-direction from the first surface 401 of the pre-cured elastomeric material 336 (or printed circuit board 855, as will be discussed with respect to FIG. 8B). In other words, in this example, the reference material 234 is assumed to be a constant 0.6 inch in the z-direction. It is recognized, however, that the reference material 234 may move in multiple dimensions simultaneously (e.g., in both the x- and z-directions).

Output voltage 460 corresponds to the output voltage of the displacement sensor 232 on the right side of FIG. 4A, and output voltage 470 corresponds to the output voltage of the displacement sensor 232 on the left side of FIG. 4A. As the reference material 234 moves to the right, the output voltage 460 increases while the output voltage 470 decreases. As the reference material 234 moves to the left, the output voltage 470 increases, while the output voltage 460 decreases. At intersection point 465, the reference material 234 is approximately at the mid-point along the x-axis between the plurality of displacement sensors 232. In FIG. 4C, the intersection point 465 is slightly offset from the point x=0, which may be caused by error in sensor sensitivity, calibration error, the initial position of the reference material 234 not being at the true midpoint, or for some other reason.

The displacement data and strain measurements may include an amount of error. For example, each of the plurality of displacement sensors 232 may have an error associated with the sensitivity of the individual displacement sensor 232. In addition, the error from each of the plurality of displacement sensors 232 may contribute to a combined error for the determination of the final position of the reference material 234 and the strain of the associated elastomeric material in the plurality of directions. In addition to error that may be introduced from being translated in the x- or z-direction (i.e., moved side to side or up and down), additional error may be introduced into the displacement data by rotation of the reference material 234. The error may increase as the reference material 234 is moved away from the plurality of displacement sensors 232. Error may be predicted, and compensated for by the processor 240 (FIG. 2) during operation in determining the displacement of the reference material 234 and the strain of the associated elastomeric material.

FIGS. 5A, 5B, and 5C are strain measurement devices 500, 505, 510 according to additional embodiments of the present disclosure. In particular, FIG. 5A is a top view of strain measurement device 500, FIG. 5B is a top view of strain measurement device 505, and FIG. 5C is a perspective view of strain measurement device 510.

Referring briefly to FIGS. 5A and 5B, the plurality of displacement sensors 232 may be coupled to the first surface 401 of the pre-cured elastomeric material 336. The reference material 234 may be coupled to the second surface (not shown in FIG. 5B, but indicated by dashed lines of the reference material 234) of the pre-cured elastomeric material 336. The plurality of displacement sensors 232 may be arranged in two dimensions (e.g., offset in both the x- and y-directions) on the first surface 401 of the pre-cured elastomeric material 336. For example, the plurality of displacement sensors 232 in FIG. 5A are arranged in a triangular configuration, while the plurality of displacement sensors 232 in FIG. 5B are arranged in an array configuration. Therefore, the reference material 234 may be located at approximately the mid-point between the plurality of displacement sensors 232 (e.g., equidistant therefrom). Of course, other quantities of displacement sensors 232 and arrangements thereof are contemplated as embodiments of the present disclosure.

Referring now specifically to FIG. 5C, the strain measurement device 510 includes the plurality of displacement sensors 232 coupled to different surfaces of the pre-cured elastomeric material 336. For example, a first displacement sensor 232 may be coupled to a first surface 401 of the pre-cured elastomeric material 336, a second displacement sensor 232 may be coupled to a third surface 403 of the pre-cured elastomeric material 336, and a third displacement sensor 232 may be coupled to a fourth surface 404 of the pre-cured elastomeric material 336. The reference material (e.g., reference material 234A) may be coupled to the second surface 402 of the pre-cured elastomeric material 336. In some embodiments, the reference material (e.g., reference material 234B) may be embedded within the pre-cured elastomeric material 336 such that the reference material 234B has an initial position that is substantially aligned in the axial direction of each of the plurality of displacement sensors 232, and equidistant therefrom.

With the plurality of displacement sensors 232 detecting their respective distance relative to the same reference material 234, the strain of the associated elastomeric material may be determined along a plurality of different axes, such as in directions of the x-, y-, and z-dimensions. As a result, the orientation of the pre-cured elastomeric material 336 may be positioned within the solid rocket motor 100 (FIG. 1) to determine strain of the different directions within the solid rocket motor 100 (e.g., within propellant 120). For example, strain may be determined in the axial direction of the solid rocket motor 100, in one or more directions that are transverse to the axial direction, or combinations thereof. Combining data from a plurality of directions may also be used to determine rotational strain within the solid rocket motor 100.

As shown in FIGS. 4A, 4B, 5A, 5B, and 5C, displacement and strain may be determined along multiple axes with the plurality of displacement sensors 232 being coupled with the same pre-cured elastomeric material 336. For example, the plurality of displacement sensors 232 may be coupled with the same surface (see, e.g., FIGS. 4A, 4B, 5A, and 5B) of the pre-cured elastomeric material 336 or with different surfaces (see, e.g., FIG. 5C) of the pre-cured elastomeric material 336. In some embodiments, however, strain of the associated elastomeric material may be determined along multiple axes with a plurality of discrete pre-cured elastomeric materials. For example, a plurality of discrete pre-cured elastomeric materials may be embedded within the propellant 120 such that each of the discrete pre-cured elastomeric materials may have at least one displacement sensor 232 and a reference material 234 coupled thereto. The plurality of discrete pre-cured elastomeric materials may be oriented within the propellant 120 along different axes.

For example, a first discrete pre-cured elastomeric material may be oriented perpendicular to the casing 110 (FIG. 1) to determine strain in a direction that is transverse to the direction of the casing 110 of the solid rocket motor 100. In other words, the axial direction of the displacement sensor 232 is perpendicular to the casing 110. A second discrete pre-cured elastomeric material may be oriented parallel to the casing 110 to determine strain in a direction that is axial to the direction of the solid rocket motor 100. In other words, the axial direction of the displacement sensor 232 is parallel to the casing 110. As a result, the combination of the displacement data for each of the orientations of the displacement sensors coupled with each of the discrete elastomeric materials of the plurality may provide displacement data and strain data for different directions. Other directions and orientations are further contemplated for the displacement sensor 232 and reference material 234.

FIG. 6 is a mold 600 for forming a pre-cured elastomeric material 336 (FIGS. 3A, 3B, and 4A) according to an embodiment of the present disclosure. The mold 600 may be used to form a pre-cured elastomeric material 336. The mold 600 may include a mold cavity 602 having a geometry that is complementary to the desired geometry of the pre-cured elastomeric material 336. The mold 600 may comprise a plurality of mold parts (e.g., two mold halves), and recesses may be formed into the adjoining surfaces of the mold parts such that the mold cavity 602 is defined by the recess surfaces in the various mold parts when assembled together.

The pre-cured elastomeric material 336 may be formed by introducing (e.g., injecting) elastomeric material into the mold cavity 602. The elastomeric material within the mold cavity 602 may be cured to form the pre-cured elastomeric material 336. After curing, the pre-cured elastomeric material 336 may be removed from the mold 600, and positioned at a desired position for strain measurement, such as at a position embedded within propellant 120 of a solid rocket motor 100 (FIG. 1).

In some embodiments, the displacement sensor 232 and the reference material 234 may be coupled with the pre-cured elastomeric material 336 during formation of the pre-cured elastomeric material 336. As a result, the displacement sensor 232 and the reference material 234 may be positioned within the mold cavity 602 to have a desired initial orientation and distance relative each other. In order to fix the displacement sensor 232 and the reference material 234 to a desired initial position within the mold cavity 602 during the introduction of the elastomeric material, a plurality of magnets 610, 612 may be positioned externally to the mold 600, such as near an outer surface of the mold 600 opposite positions of the displacement sensor 232 and the reference material 234. For example, a first magnet 610 may be positioned on a first external face 604 of the mold 600 to hold the displacement sensor 232 against a corresponding first internal wall 605 of the mold cavity 602. Likewise, a second magnet 612 may be positioned on a second external face 606 of the mold 600 to hold the reference material 234 against a corresponding second internal wall 607 of the mold cavity 602. As the first magnet 610 and the second magnet 612 may be used to maintain the displacement sensor 232 and the reference material 234 in place during curing, the displacement sensor 232 and the reference material 234 may include a material that may be magnetically attractive (e.g., magnet, metal components, etc.). The magnets 610, 612 may generate a magnetic field of a sufficient strength to maintain attraction through the mold 600. It is contemplated that other attachment methods may be implemented in order to maintain the initial position and orientation of the displacement sensor 232 and the reference material 234 during the molding and curing process. For example, an adhesive may be applied to temporarily attach the displacement sensor 232 and reference material 234 to the respective first internal wall 605 and the second internal wall 607 of the mold cavity 602.

Figure 7:
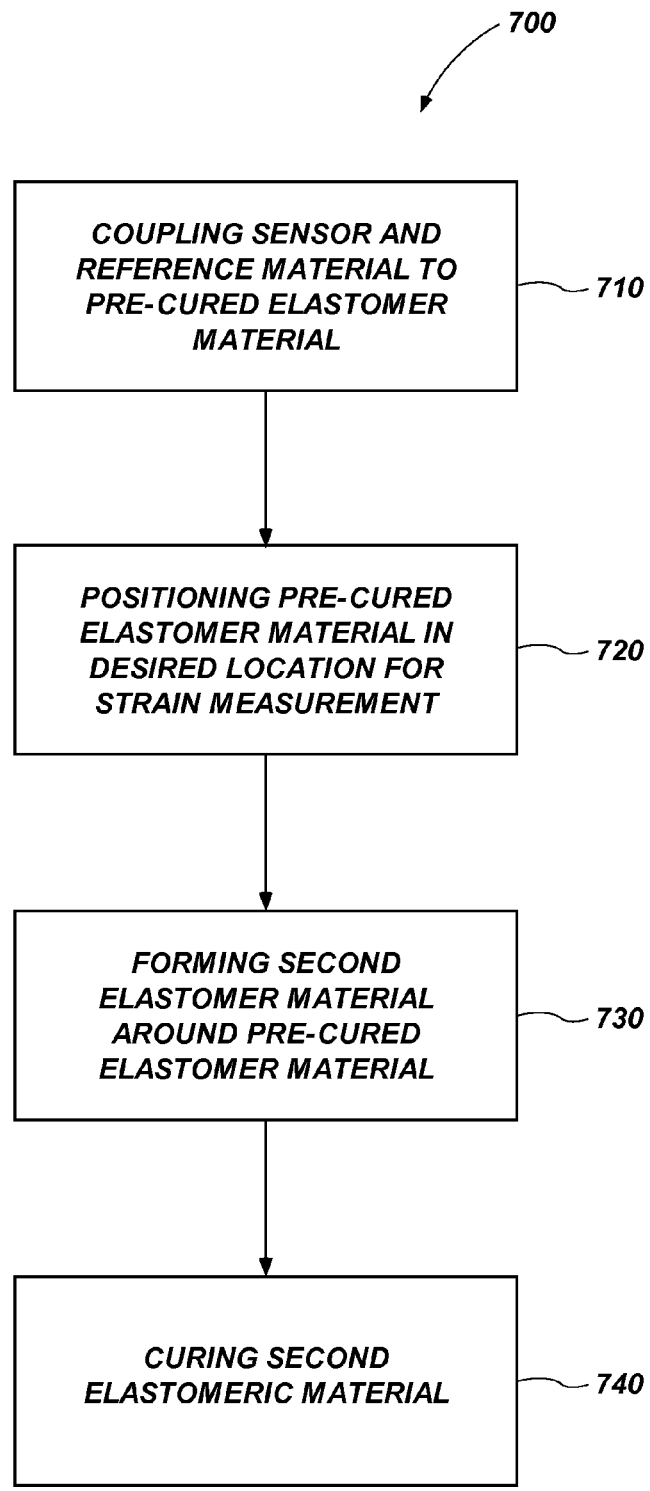
FIG. 7 is a flowchart illustrating a method for installing a strain measurement device in an elastomeric material according to an embodiment of the present disclosure.

FIG. 7 is a flowchart 700 illustrating a method for installing a strain measuring device in an elastomeric material according to an embodiment of the present disclosure. For example, the elastomeric material may be propellant 120 or another elastomeric material within a solid rocket motor 100 (FIG. 1).

At operation 710, a displacement sensor 232 and a reference material 234 may be coupled to a pre-cured elastomeric material 336 (FIGS. 3A, 3B, and 4A). For example, operation 710 may include forming a pre-cured elastomeric material 336 and attaching the displacement sensor 232 and the reference material 234 on an outer surface of the pre-cured elastomeric material 336 after curing the pre-cured elastomeric material 336. In other embodiments, operation 710 may include introducing an elastomeric material in a viscous form around at least a portion of the displacement sensor 232 and the reference material 234, and subsequently curing the elastomeric material to form the pre-cured elastomeric material 336. At least a portion of the displacement sensor 232 and the reference material 234 may be embedded within the pre-cured elastomeric material 336. As an example, the displacement sensor 232 and the reference material 234 may be positioned within a mold cavity 602 of a mold 600 (FIG. 6) having a shape that is complementary to a desired shape for the pre-cured elastomeric material 336, and the elastomeric material may be introduced into the mold cavity 602 to be cured. The displacement sensor 232 and the reference material 234 may be maintained in a position within the mold cavity 602 with a plurality of magnets 610, 612 (FIG. 6) positioned at outer surfaces of the mold 600. Other embodiments may include embedding a portion of the displacement sensor 232 or the reference material 234 within the pre-cured elastomeric material 336 after curing the pre-cured elastomeric material.

At operation 720, the pre-cured elastomeric material 336, including at least one of the displacement sensor 232 and the reference material 234 coupled thereto, may be positioned at a desired location for strain measurement, such as within a cavity that houses an elastomeric material to be measured. For example, the cavity that houses an elastomeric material may be a cavity of the solid rocket motor 100 that houses the propellant 120. The pre-cured elastomeric material 336 may be positioned at a location within the cavity of the solid rocket motor 100 for the desired strain measurement, such as proximate the flap bulb 118.

At operation 730, a second elastomeric material may be formed around the pre-cured elastomeric material 336, such as being introduced into the cavity of the solid rocket motor 100. At operation 740, the second elastomeric material may be cured. For embodiments in which the second elastomeric material is the propellant 120 of a solid rocket motor 100, the propellant 120 may be viscous when formed within the solid rocket motor 100 and introduced around the pre-cured elastomeric material 336. The propellant 120 may exhibit properties of elasticity if cured to a solid form.

As a result, during operations 720 and 730 the pre-cured elastomeric material 336 may be positioned within the cavity of the solid rocket motor 100 at a desired location for strain measurement, and the propellant 120 may be cast within the cavity. In addition, the pre-cured elastomeric material 336 may be formed from propellant or another elastomeric material.

While several embodiments describe the displacement sensor 232 and the reference material 234 being coupled to the pre-cured elastomeric material 336, in additional embodiments, the displacement sensor 232 and the reference material 234 may be embedded within the propellant 120 directly without the pre-cured elastomeric material 336. For example, the displacement sensor 232 and the reference material 234 may be positioned directly within the cavity of a solid rocket motor 100 at a desired initial distance and orientation. The propellant 120 may be introduced and cured within the cavity around the displacement sensor 232 and the reference material 234. Such an embodiment without the pre-cured elastomeric material 336 may be implemented in situations in which the propellant exhibits a relatively low viscosity prior to curing, such as a relatively liquid consistency, such that the displacement sensor 232 and the reference material 234 may be likely to maintain their initial position and orientation. The displacement sensor 232 and the reference material 234 may be maintained at their initial positions during curing of the propellant 120 through an adhesive to the liner 114, magnets being placed outside of the casing 110 similar to the method described with respect to the mold 600, or through other attachment methods.

Figure 8A:
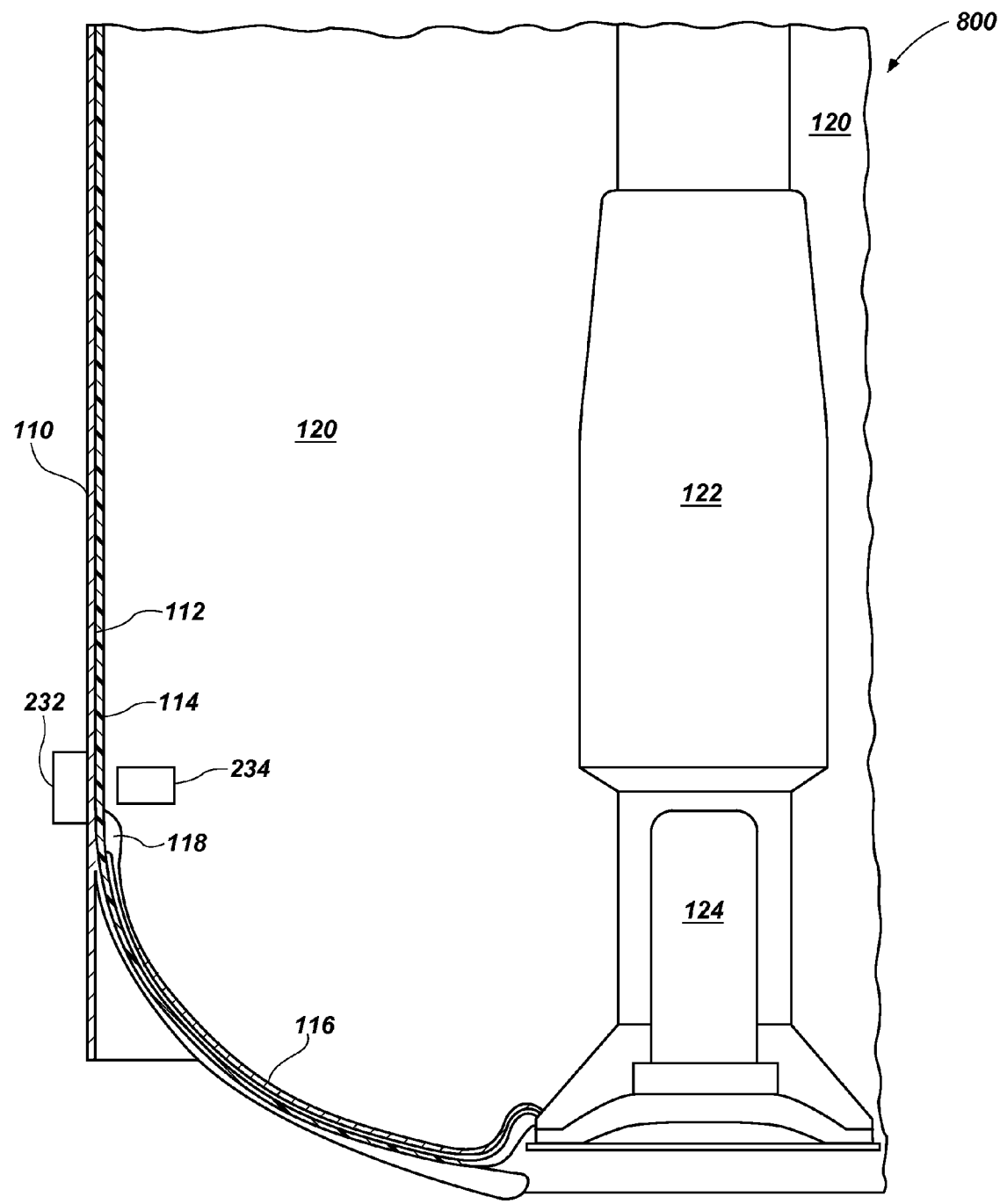
FIG. 8A is a solid rocket motor having a strain measurement device according to another embodiment of the present disclosure.

FIG. 8A is a solid rocket motor 800 having a strain measurement device according to another embodiment of the present disclosure. The strain measurement device includes one of the displacement sensor 232 and the reference material 234 embedded within the propellant 120 and the other of the displacement sensor 232 and the reference material 234 positioned in a fixed position external to the casing 110. For example, the reference material 234 may be embedded within the propellant 120 through one of the various methods previously discussed, and the displacement sensor 232 may be coupled externally to the casing 110.

In operation, the reference material 234 may be displaced relative the displacement sensor 232 responsive to a force being applied to the solid rocket motor 800 sufficient to cause strain within the propellant 120. The displacement sensor 232 may detect a change in the relative distance (e.g., such as through a change in the detected magnetic field) from the reference material 234, and transmit such data to a processor 240 (FIG. 2). The processor 240 may analyze the data from the displacement sensor 232 to estimate a strain being experienced by the propellant 120. Although a single displacement sensor 232 may be coupled externally to the casing 110, a plurality of displacement sensors 232 (see, e.g., FIG. 8B) may be coupled externally to the casing 110 to obtain strain data long a plurality of axes.

Figure 8B:
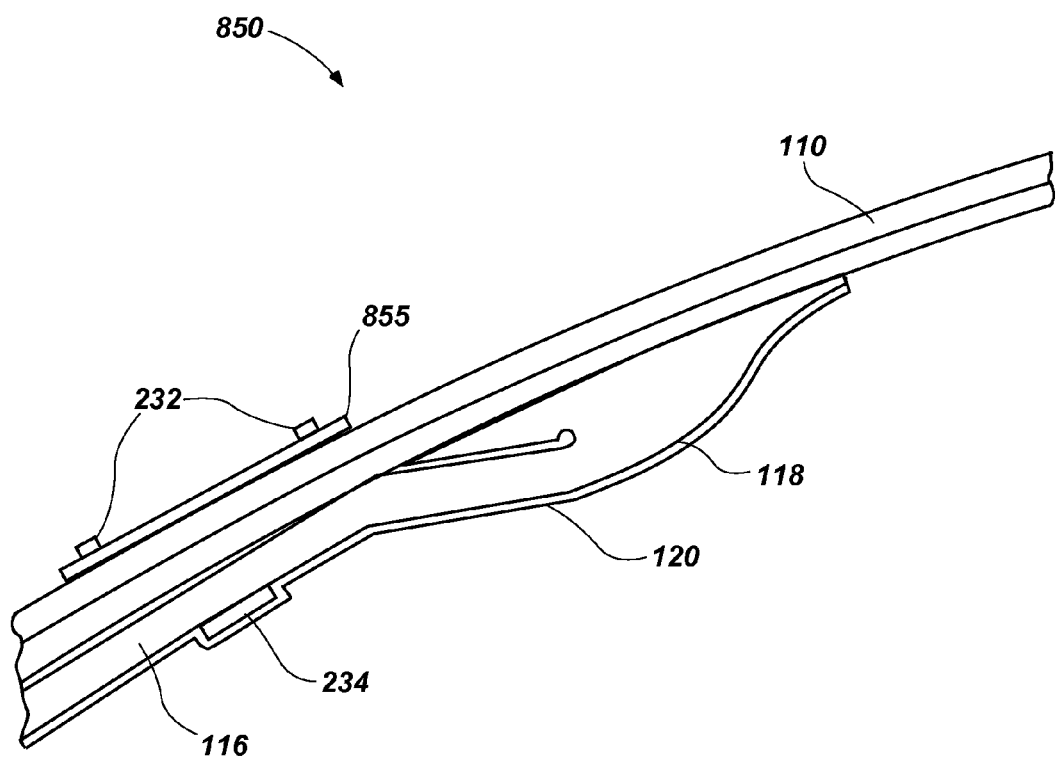
FIG. 8B is a portion of a solid rocket motor according to another embodiment of the present disclosure.

FIG. 8B is a portion of a solid rocket motor 850 according to another embodiment of the present disclosure. The solid rocket motor 850 includes a strain measurement device that includes a plurality of displacement sensors 232 located in a fixed position external to the casing 110. The strain measurement device further includes the reference material 234 coupled with an elastomeric material, such as at least one of the liner 114 (FIG. 1) and the propellant 120. In some embodiments, the reference material 234 may be embedded at least partially within the propellant 120. As a result, the plurality of sensors 232 may be at least substantially stationary as being in a fixed position on the casing 110, while the reference material 234 may be moved relative to the plurality of sensors 232 as the elastomeric material (e.g., liner 114, propellant 120) is stretched.

The plurality of displacement sensors 232 may be coupled (e.g., soldered) to a printed circuit board 855. The printed circuit board 855 may be coupled with the external surface of the casing 110. The reference material 234 may have an initial position that is approximately half-way (i.e., midpoint) between the plurality of displacement sensors 232 in the transverse direction.

As described above with reference to FIG. 4A, the plurality of sensors 232 may be configured to provide displacement data on separate data channels. As a result, in operation, the combined displacement data from each of the plurality of displacement sensors 232 may be used by the 240 (FIG. 2) to determine (e.g., via triangulation) the location of the reference material 234 in space relative the plurality of displacement sensors 232 in a plurality of directions. In other words, the reference material 234 may be positioned such that the reference material 234 can be translated in at least two axes, normal to the surface of the circuit board (i.e., the axial direction of the plurality of displacement sensors 232), and side-to-side along the line between the plurality of displacement sensors 232 on the printed circuit board 855 (i.e., the transverse direction of the plurality of displacement sensors 232). In some embodiments, a desirable location for the plurality of displacement sensors 232 on the printed circuit board 855 may be as close together as the solder pads allow. In one embodiment, the plurality of sensors 232 may be located near the center of the printed circuit board 855 in order to allow closer spacing of the solder pads of the plurality of displacement sensors 855.

FIGS. 9A and 9B are plots of test results 900, 950 from a strain sensor coupled with a pre-cured elastomeric according to an embodiment of the present disclosure. In particular, the test results 900, 950 may be generated from a displacement sensor 232 and a reference material 234 coupled with a pre-cured elastomeric material 336, similar to the strain sensor 130 of FIGS. 3A and 3B. The displacement sensor 232 may generate the displacement data and strain data as discussed above. In addition, the test results 900, 950 show visual strain data for comparison with the strain data determined from the displacement data generated by the displacement sensor. For example, four visual dots were applied to the face of the pre-cured elastomeric material 336, and digital pictures were taken every ten seconds during the test. The visual strain data from the photographs were measured and plotted against the strain measurements from the displacement sensor 232. The pre-cured elastomeric material 336 was inserted into a tensile test machine and pulled at a constant rate of 0.2 inch.

Referring specifically to FIG. 9A, the test results 900 correspond to the strain measured in the axial direction of the displacement sensor 232. Line 901 is the measured strain from the displacement sensor 232, and line 902 is the measured strain from the photographs by observing the axial displacement of the visual dots inked on the surface of the laboratory specimens over time. Referring specifically to FIG. 9B, the test results 950 correspond to the strain measured in the transverse direction of the displacement sensor 232. Line 951 is the measured strain from the displacement sensor 232, and line 951 is the measured strain from the photographs by observing the transverse displacement of the visual dots over time. Therefore, as shown in FIGS. 9A and 9B, the strain data measured by the displacement sensors 232 substantially matches the photographic data within an appropriate error margin.

CONCLUSION

In some embodiments, a strain measurement device includes a reference material, a displacement sensor, and a processor operably coupled with the displacement sensor. At least one of the displacement sensor and reference material is coupled with a pre-cured elastomeric material. The displacement sensor is configured to detect changes in distance between the displacement sensor and the reference material and generate a data signal in response thereto. The processor is configured to determine a strain of another elastomeric material based at least in part on the data signal received from the displacement sensor.

In additional embodiments, a method for installing a sensor of an elastomeric material is disclosed. The method comprises coupling a displacement sensor and a reference material to a pre-cured elastomeric material, and forming a second elastomeric material around the pre-cured elastomeric material.

In additional embodiments a method for determining strain of an elastomeric material of a solid rocket motor is disclosed. The method comprises generating a data signal in response to sensing a change in distance between a displacement sensor and a reference material in response to a force applied to an elastomeric material of a solid rocket motor, and determining a strain on the elastomeric material based at least in part on the data signal.

In yet another embodiment, a solid rocket motor is disclosed. The solid rocket motor comprises a casing defining a cavity configured to house a propellant, a liner coupled with the casing and configured to couple with the propellant, and at least one of a displacement sensor and a reference material positioned in an elastomeric material within the casing. The displacement sensor and the elastomeric material are initially positioned at a predefined relative distance and the displacement sensor is configured to transmit data representing a relative distance between the displacement sensor and the reference material to a processor configured to determine strain experienced by the elastomeric material responsive to the relative distance.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the scope of the invention as defined by the following appended claims and their legal equivalents. For example, elements and features disclosed in relation to one embodiment may be combined with elements and features disclosed in relation to other embodiments of the present invention.

What is claimed is:

1. An apparatus, comprising:
   a pre-cured elastomeric material;
   another elastomeric material; and
   a strain measurement device, comprising:
      a reference material;
      a displacement sensor, wherein at least one of the displacement sensor and the reference material is coupled with the pre-cured elastomeric material, and the another elastomeric material is formed around the pre-cured elastomeric material such that the displacement sensor and the reference material have an initial distance therebetween, the displacement sensor configured to generate a data signal responsive to detecting changes in distance between the displacement sensor and the reference material; and
      a processor operably coupled with the displacement sensor, the processor configured to receive the data signal and determine a strain of the another elastomeric material based, at least in part, on the data signal received from the displacement sensor.

2. The apparatus of claim 1, wherein the displacement sensor is a Hall-effect sensor, and the reference material is a magnet.

3. The apparatus of claim 1, wherein the displacement sensor is an Eddy-current sensor, and the reference material is selected from the group consisting of a metal and a metal alloy.

4. The apparatus of claim 1, wherein the displacement sensor and the reference material are coupled to opposing ends of the pre-cured elastomeric material.

5. The apparatus of claim 4, wherein the displacement sensor and the reference material are at least partially embedded within the pre-cured elastomeric material.

6. The apparatus of claim 1, further comprising a plurality of displacement sensors coupled to the pre-cured elastomeric material.

7. The apparatus of claim 6, wherein the displacement sensors of the plurality are oriented relative to the reference material to determine strain of the another elastomeric material along a plurality of different axes.

8. A method for installing a strain measurement device in an elastomeric material, the method comprising:
forming a strain measurement device by coupling a displacement sensor and a reference material to a pre-cured elastomeric material at an initial distance, the displacement sensor configured to generate a data signal in response to detecting changes in distance between the displacement sensor and the reference material from the initial distance;
forming a second elastomeric material around the pre-cured elastomeric material after the displacement sensor and the reference material have been coupled to the pre-cured elastomeric material; and
operably coupling a processor with the displacement sensor, the processor configured to determine a strain of the second elastomeric material based, at least in part, on the data signal received from the displacement sensor.

9. The method of claim 8, wherein forming the second elastomeric material around the pre-cured elastomeric material includes:
positioning the pre-cured elastomeric material within a cavity of a solid rocket motor; and
casting a propellant within the cavity.

10. The method of claim 9, further comprising forming the pre-cured elastomeric material from propellant.

11. The method of claim 8, wherein coupling the displacement sensor and the reference material to the pre-cured elastomeric material includes coupling the displacement sensor and the reference material after curing the pre-cured elastomeric material.

12. The method of claim 8, wherein coupling the displacement sensor and the reference material to the pre-cured elastomeric material includes:
introducing a viscous elastomeric material around at least a portion of the displacement sensor and the reference material; and
curing the elastomeric material to form the pre-cured elastomeric material.

13. The method of claim 12, wherein introducing the viscous elastomeric material around at least a portion of the displacement sensor and the reference material includes:
positioning the displacement sensor and the reference material within a mold cavity of a mold having a shape that is complementary to a desired shape for the pre-cured elastomeric material; and
introducing the viscous elastomeric material into the mold cavity.

14. The method of claim 13, further comprising maintaining the displacement sensor and the reference material in position with a plurality of magnets positioned near an outer surface of the mold, corresponding to opposite positions of the displacement sensor and the reference material.

15. The apparatus of claim 1, further comprising a solid rocket motor comprising:
a casing defining a cavity configured to house a propellant; and
a liner coupled with the casing and configured to couple with the propellant, wherein at least one of the displacement sensor and the reference material is positioned within the casing, wherein the displacement sensor and the reference material are initially positioned at a pre-defined relative distance, and wherein the data signal represents a relative distance between the displacement sensor and the reference material.

16. The apparatus of claim 15, wherein at least one of the displacement sensor and the reference material is positioned within the liner.

17. The apparatus of claim 15, further comprising the propellant cast within the cavity.

18. The apparatus of claim 17, wherein at least one of the displacement sensor and the reference material is positioned within the propellant.

19. The apparatus of claim 18, wherein the liner comprises a flap and a flap bulb proximate a frontal portion of the casing, and wherein at least one of the displacement sensor and the reference material is positioned within the propellant proximate the flap bulb.

20. The apparatus of claim 18, wherein both the displacement sensor and the reference material are coupled to the pre-cured elastomeric material that is embedded within the propellant.

21. The apparatus of claim 20, wherein the pre-cured elastomeric material comprises a substantially similar chemical composition as the propellant.

22. The apparatus of claim 15, wherein the other of the displacement sensor and the reference material is positioned at a fixed location of an outer surface of the casing.

23. The apparatus of claim 15, further comprising a plurality of displacement sensors configured to generate separate data signals, wherein the processor is configured to determine the strain experienced by the another elastomeric material along a plurality of directions responsive to the separate data signals.

24. The apparatus of claim 15, wherein the displacement sensors of the plurality are at least substantially parallel in their axial directions, and wherein the processor is configured to determine the strain by triangulation of the separate data signals.

* * * * *